(12) United States Patent
Shine

(10) Patent No.: US 6,461,548 B1
(45) Date of Patent: Oct. 8, 2002

(54) METHOD FOR IMPROVING INJECTION MOLDING OF TRANSPARENT OPTICAL COMPONENTS

(76) Inventor: Robert J. Shine, 265 E. 16th Pl. #3, Costa Mesa, CA (US) 92627

( * ) Notice: Subject to any disclaimer, the term of this patent is extended or adjusted under 35 U.S.C. 154(b) by 0 days.

(21) Appl. No.: 09/488,238

(22) Filed: Jan. 20, 2000

Related U.S. Application Data

(60) Provisional application No. 60/116,437, filed on Jan. 20, 1999.

(51) Int. Cl.[7] .................................................. B29C 33/72
(52) U.S. Cl. ........................... 264/39; 134/38; 264/1.1; 264/169
(58) Field of Search ................................ 264/1.1, 1.33, 264/39, 169; 134/26, 105, 19, 38; 425/225

(56) References Cited

U.S. PATENT DOCUMENTS 4,332,841 A * 6/1982 Price ........................... 264/39
4,375,819 A * 3/1983 Kyatt
6,245,822 B1 * 6/2001 Terada et al.

FOREIGN PATENT DOCUMENTS

JP 2-307737 * 12/1990
WO WO95/07153 * 3/1995

* cited by examiner

Primary Examiner—Mathieu D. Vargot
(74) Attorney, Agent, or Firm—Crosby, Heafey, Roach & May

(57) ABSTRACT

The present method for improving the quality of injection molded optical components consists of proper cleaning of the injection molding apparatus between uses. Injection parts that are not subjected to pressurized polymer are cleaned by passage through a series of isopropyl alcohol baths. At each stage clean brushes are used to remove any contaminating polymer. Those injection parts that are subjected to pressurized polymer are best passivated by a succession of thermal cycles in isopropyl alcohol. Thermal cycling removes a contaminant or charge that promotes pre-curing of polymer during the injection process.

10 Claims, 4 Drawing Sheets

METHOD FOR IMPROVING INJECTION MOLDING OF TRANSPARENT OPTICAL COMPONENTS

The present application is based on U.S. Provisional Applications No. 60/116,437 filed on Jan. 20, 1999 and claims priority from that application.

BACKGROUND OF THE INVENTION

1. Field of the Invention

The present application concerns methods to improve the quality of injection molded optical components.

2. Description of Related Art

Currently, even "optimum" conditions for injection molding silicone lenses and other optical components including intraocular lenses, and soft contact lenses, produces an unacceptably high number of lenses with optical defects. These defects originate from areas of resin that polymerizes ("cures") at a different rate than the bulk of the resin making up the lens. This problem of "pre-curing" is related to resin residue that sticks to the various parts of the injection apparatus. This problem also appears to be due to buildup of a static charge within the resin mass. In any case, regular or haphazard cleaning methods fail to alleviate this problem. Through careful experimentation I have developed a protocol that specifies the conditions and steps to rid an injection system of impurities and static charge.

SUMMARY OF THE INVENTION

The present method for improving the quality of injection molded optical components consists of proper cleaning of the injection molding apparatus between uses. Injection parts that are not subjected to pressurized polymer are cleaned by passage through a series of isopropyl alcohol baths. At each stage clean brushes are used to remove any contaminating polymer. Those injection parts that are subjected to pressurized polymer are best passivated by a succession of thermal cycles in isopropyl alcohol. Thermal cycling removes a contaminant or charge that promotes pre-curing of polymer during the injection process.

DETAILED DESCRIPTION OF THE PREFERRED EMBODIMENTS

The following description is provided. to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a method for improving quality of injection molded optical components.

Figure 1:
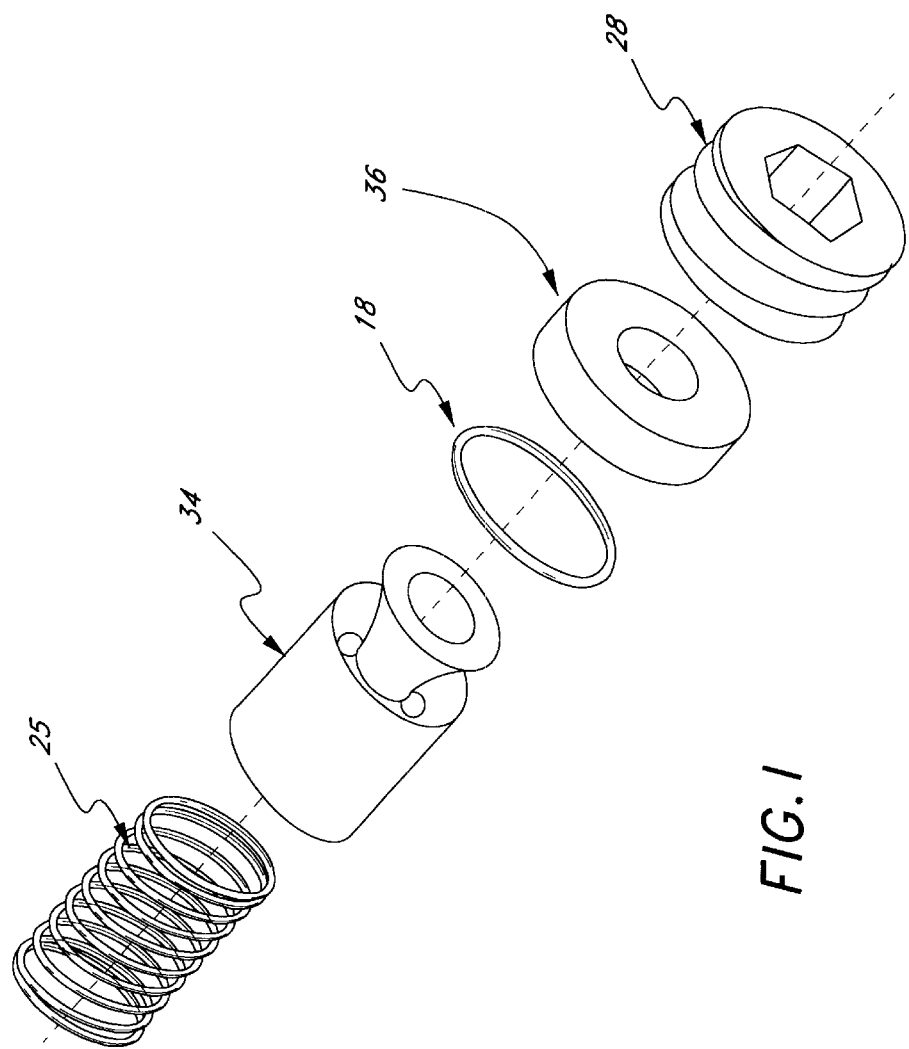
FIG. 1 shows components of a typical check valve of an injection machine.

I have found that a major source of inclusions and other imperfections of injection molded silicone optics comes from the pre-curing of silicone material within the mechanical parts of the check valve assembly (FIG. 1). Although this description is aimed towards silicones, the invention is also useful with any other thermal setting injectable polymers. The check valves are equipped with filters (see FIG. 4) to trap particulate contaminants. However, the pre-cured material is not actually solid so it is not stopped by the filter. Rather the material is beginning to polymerize so that is creates an optical discontinuity in the molded component. When there is a static charge within the material, pressure allows the silicone to start to polymerize without the normally required heat.

To avoid the problem caused by the static electricity, one must "de-staticize" the machine check-valve parts. This is accomplished with a series of heating up & cooling cycles. Heating the check valve or other parts in isopropyl alcohol seems to eliminate the static electricity. On the other hand, cooling the check valve or other machine parts in isopropanol attracts or augments static electricity. However, during a repeated alternation of hot and room temperature isopropyl alcohol eliminates static electricity from the check valve and other parts. Part of the function of the process is to dissolve and remove pre-cured silicone that may adhere to the parts. However, simple removal does not appear to avoid the pre-curing problem. Rather thermal cycling in appropriate solvents is necessary to effectively resolve the problem.

Isopropyl alcohol (isopropanol) is an excellent organic solvent for this process because it is environmentally friendly and relatively non-toxic. Also, it has a fairly high flash point. In the case of silicones none of the common organic solvents actually do a good job of dissolving the silicone materials. With some other thermal setting polymers acceptable organic solvents are available that actually dissolve the polymer. Other organic solvents, particularly alcohols, ethers and ketones are usable in the present process. Favorable alcohols include ethanol, methanol, propanol and butanol. It is believed that alcohols in particular are effective in removing the charge that contributes to pre-curing. Effective ketones include acetones and methyl ethyl ketone. Effective ethers include complex ethers such as methoxyethanol, ethoxyethanol and butoxyethanol. Effective ketones include acetones and methyl ethyl ketone. Effective ethers include complex ethers such as methoxyethanol, ethoxyethanol and butoxyethanol.

Figure 2:
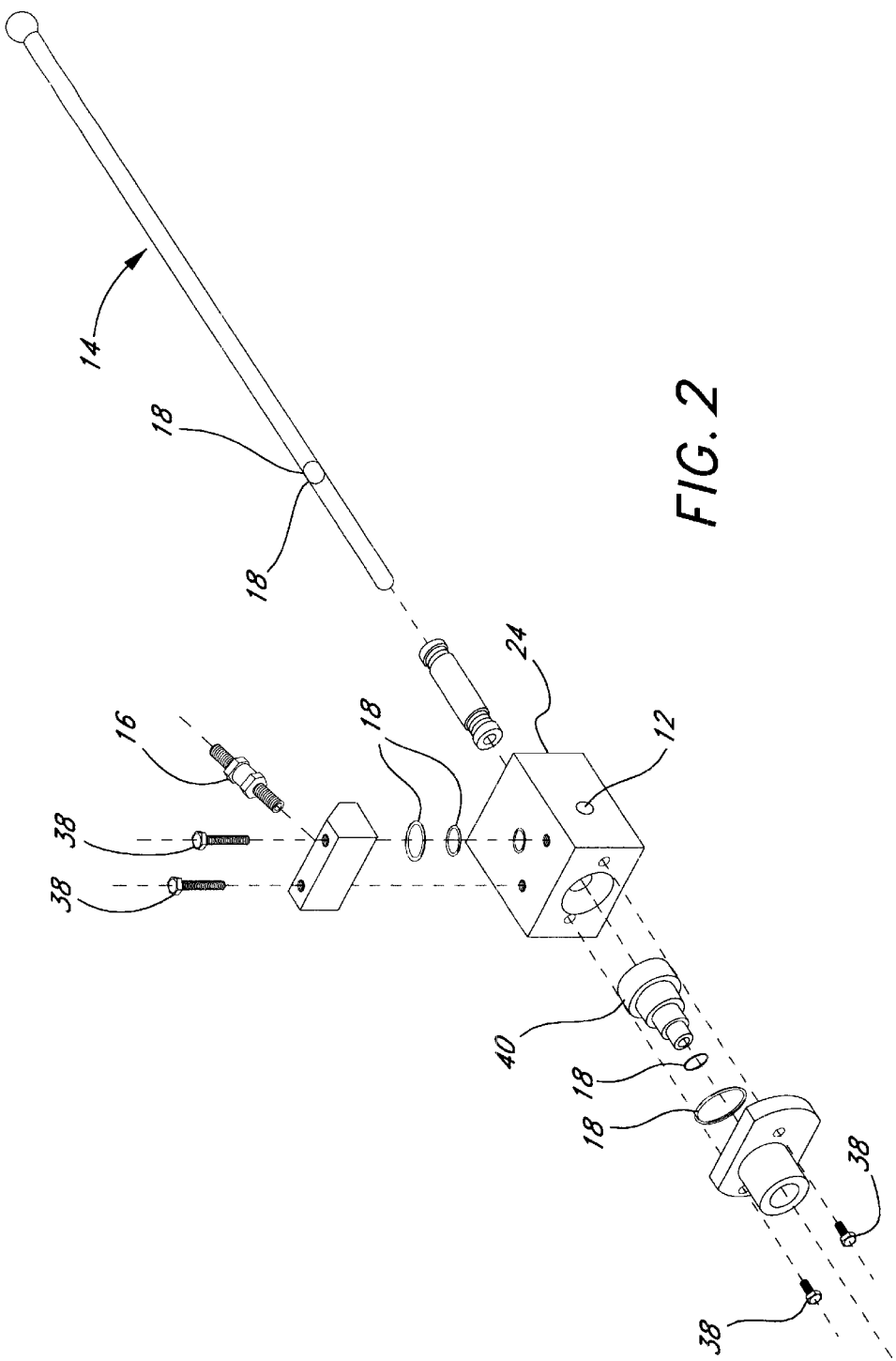
FIG. 2 shows an injection block of an injection system with a single moving injection plunger.
Figure 3:
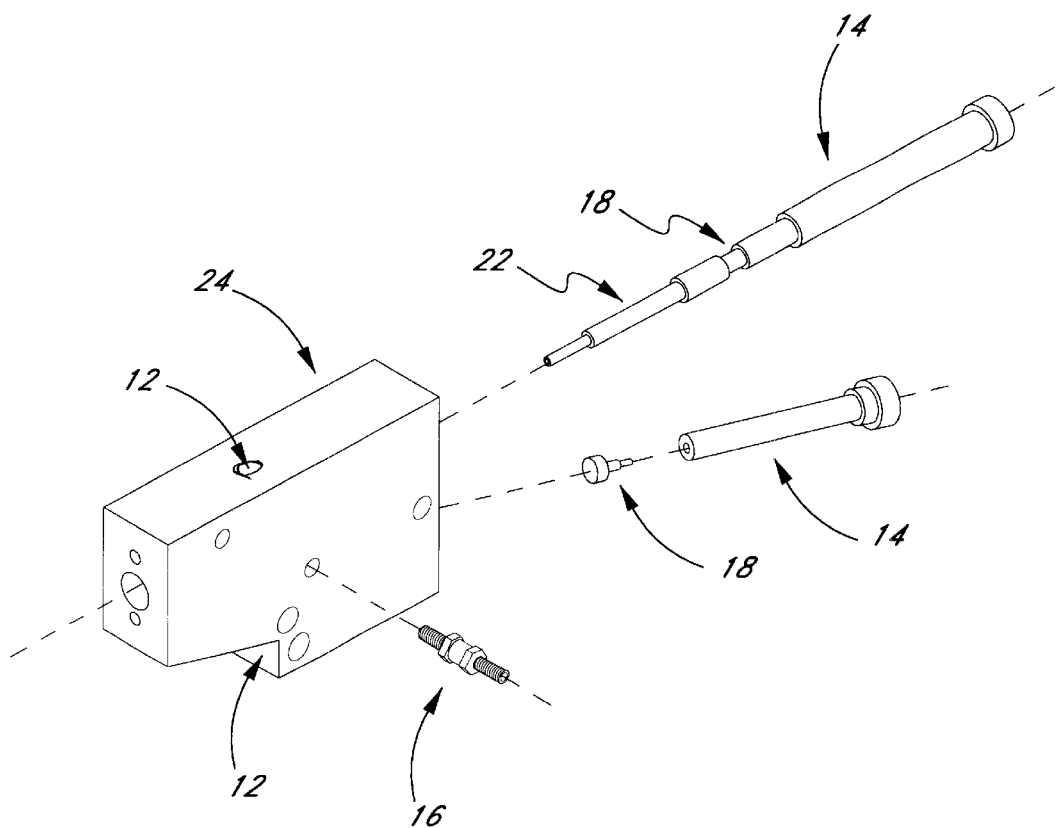
FIG. 3 shows an injection block of an injection system with two moving injection plungers.
Figure 4:
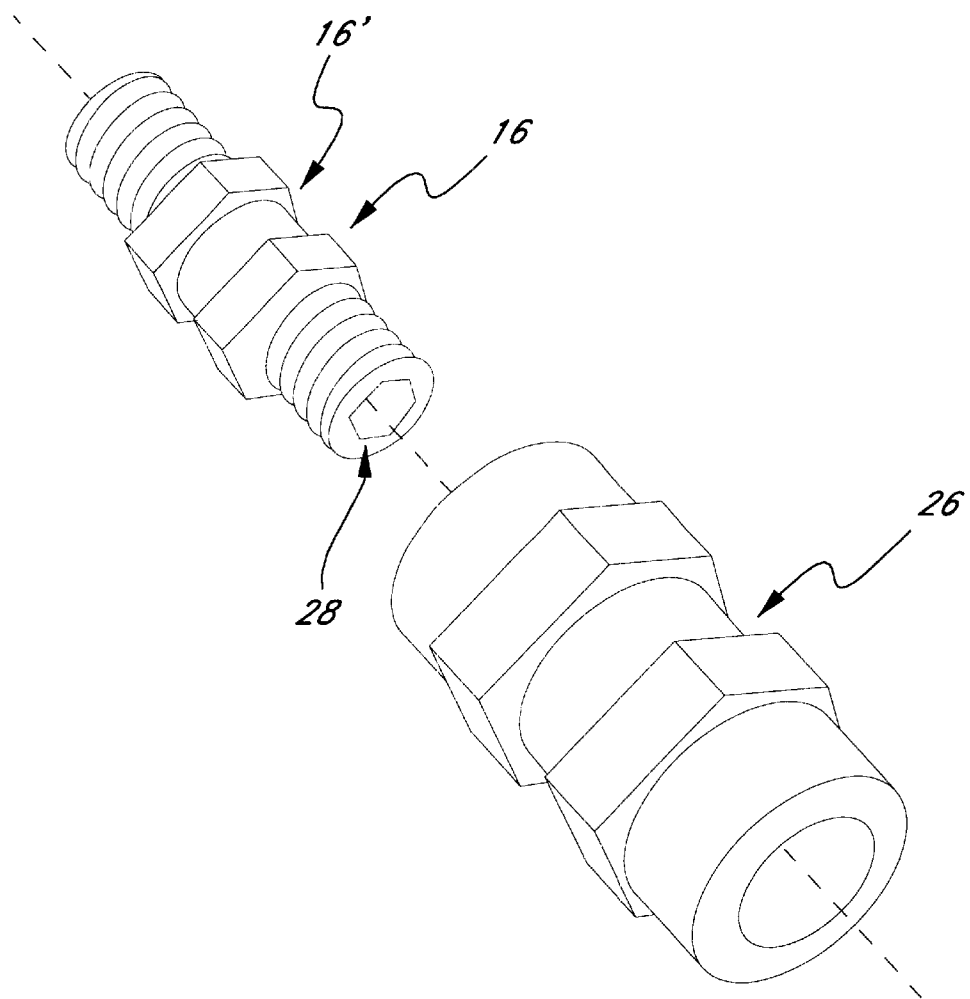
FIG. 4 shows a close up of a complete check valve assembly with a filter.

The machine injection system parts are separated into in three categories: friction, non-friction & pressurized. The friction parts consist of moving injection plungers 14 (FIGS. 2 and 3). The older style machine blocks have two moving plungers 14 which include a nozzle shut off probe 22. While, the newer machine blocks 24 have only one (FIG. 2). The non friction parts consist of stationary, non-moving parts: the injection block 24 and the nozzle 40 (FIGS. 2 and 3). The pressurized parts consist of the check valve poppet 34, spring 32, nut 28, retainer 36, check valve jacket 16' & material filter 26 (FIG. 4). These parts are under pressure by compressed air. The parts are sealed with a number of o-rings 18 (which should also be cleaned) and assembled with screws 38. The block temperature is water cooled with the cooling fluid entering through water input apertures 12.

Cleaning the machine parts (friction, non-friction, and pressurized), to reach an optimum pH is critical to prevent pre-curing. If the pH of the machine parts is basic (significantly greater than pH 7.0), there is a greater tendency to pre-cure. On the other hand, if the parts are acidic (significantly below pH 7.0) an oxide coating that normally coats the parts is dissolved away allowing direct metal to metal contact. Generally, the surface pH of the parts should match that of the injected silicone. It is necessary to avoid overcleaning or the surface characteristics of the parts may be negatively affected. I have found that friction of bare metal on bare metal leads directly to pre-curing. Many modern injection systems use metal parts coated with a fluorocarbon such as polytetrafluoroethylene. This material prevents the bare metal friction problem but actually causes increased static buildup so that the following cleaning procedure is still required. overcleaning or the surface characteristics of the parts may be negatively effected. I have found that friction of bare metal on bare metal leads directly to pre-curing. Many modern injection systems use metal parts coated with a fluorocarbon such as polytetrafluoroethylene. This material prevents the bare metal friction problem but actually causes increased static buildup so that the following cleaning procedure is still required.

The cleaning of the friction/non-friction parts takes place in three phases.

Tank #1 contains of isopropyl alcohol (1.5 gallons in this example.) at room temp. Nylon brushes are used to clean the friction/non-friction parts free of cured silicone. These particular nylon brushes should stay with tank #1, to prevent against cross contamination, until the brushes are subjected to a hot soak (40–50° C.) cleaning process. In this and all subsequent cleaning steps the brushes are cleaned by soaking in hot isopropyl alcohol until any unpolymerized silicone on the brushes is completely cured. Then the cured (hardened) material is removed by rubbing the brushes together. If the material does not all flake off, the hot soak must be repeated. This ensures that contaminants are not returned to the isopropyl alcohol bath. The parts should soak in each bath for at least 16 hours.

Tank #2 also contains. of isopropyl alcohol (1.5 gallons) at room temp. Nylon brushes are used to clean the friction/non-friction parts free of cured silicone. Again, the brushes stay with tank #2, to prevent against cross contamination.

Tank #3 contains 1.5 gal. of virgin isopropyl alcohol at room temp. To ensure cleanliness the isopropyl alcohol is filtered through a very fine filter paper or preferably a sub 10 $\mu$m filter. Nylon brushes are used to clean friction/non-friction parts free of cured silicone. The used brushes are kept with tank #3, to prevent against cross contamination.

Friction/non-friction parts are air dried after tank #3 cleaning. After friction/non-friction parts are air dried, they are ready for use in injection molding.

Cleaning of the pressurized parts consists of heating/cooling cycles in isopropyl alcohol. Again, the isopropyl alcohol does not dissolve the silicone, but I have found that proper temperature cycling removes the contaminants and eliminates the static electricity problem. The parts normally cleaned by temperature cycling are the check valve, the poppet, the spring, the check valve jacket and the material filter (FIG. 4). The material filter requires initial cleaning in hot isopropyl alcohol (50° C.) to prevent cross contamination. As an alternative to cleaning, the filter may simply be replaced for each use.

Isopropyl alcohol boils at about 80° C. which is significantly lower than the preferred silicone curing temperature of 100–105° C. Therefore, even in boiling isopropyl alcohol the silicone will not cure as rapidly as in the injection mold. The thermal cycling is generally below the boiling point of isopropyl alcohol and is generally between about 25° C and 60° C. More preferably the thermal cycle is between 25° C. and 38° C. Without sufficient thermal cycling the cleaned parts rapidly show pre-curing problems that are believed to be due to buildup of charge on the parts. It is believed that the contamination that results in pre-curing is due to static charge as opposed to actual accumulation of material because parts that appear perfectly clean still lead to pre-curing. However, after repeated thermal cycling, the pre-curing tendency vanishes. Leaving the parts in isopropyl alcohol at either of the temperatures even for a prolonged period of time fails to achieve the same result. The rate of temperature change and the duration of the cycle is probably important but has not been extensively studied. Good results are achieved where each heating-cooling phase lasts for approximately one-five hours. After the alcohol is heated or cooled, the parts should remain in the liquid for at least 8 hours until the next step. That is, the heating cycle lasts at least 8 hours and is immediately followed by an at least 8 hour cooling cycle. Then the parts are moved into fresh isopropyl alcohol for another cycle. This way it is easy to perform one cycle per day (8 hours hot during the working shift with 16+hours cold over night). This should be repeated for at least 1 week (five complete cycles). Although the check valve jacket 16' can be considered a pressurized part, optimal results can be obtained with only a brief cleaning of the jacket.

In addition to the equivalents of the claimed elements, obvious substitutions now or later known to one with ordinary skill in the art are defined to be within the scope of the defined elements. The claims are, thus to be understood to include what is specifically illustrated and described above, what is conceptually equivalent, what can be obviously substituted and also what essentially incorporates the essential idea of the invention. Those skilled in the art will appreciate that various adaptations and modifications of the just described preferred embodiment can be configured without departing from the scope and spirit of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. A method of reducing or eliminating pre-curing optical defects in injection molded optical components comprising the step of thermally cycling injection machine parts that are subjected to pressure during injection of the optical components in organic solvent.

2. The method of claim 1, wherein the organic solvent is selected from the group consisting of alcohols, ethers and ketones.

3. The method of claim 2, wherein the organic solvent is selected from the group consisting of methanol, ethanol, propanol, butanol, isopropanol, methoxyethanol, ethoxyethanol, butoxyethanol, acetone and methyl ethyl ketone.

4. The method of claim 1, wherein the organic solvent is thermally cycled from about 25° C. to about 50° C.

5. The method of claim 4, wherein the organic solvent is thermally cycled from about 25° C. to about 40° C.

6. The method of claim 1, further comprising a step of immersion cleaning injection machine parts that are not subjected to pressure during injection of the optical components in room temperature baths of organic solvent.

7. The method of claim 6, wherein the organic solvent used to immerse said injection machine parts is selected from the group consisting of alcohols, ethers and ketones.

8. The method of claim 7, wherein the organic solvent used to immerse said injection machine parts is selected from the group consisting of methanol, ethanol, propanol, butanol, isopropanol, methoxyethanol, ethoxyethanol, butoxyethanol, acetone and methyl ethyl ketone.

9. A method for reducing or eliminating pre-curing optical defects in injection molded optical components comprising the step of thermally cycling injection machine parts that are subjected to pressure during injection of the optical components in isopropyl alcohol, wherein each thermal cycle comprises heating the alcohol from room temperature to about 40° C. followed by cooling back to room temperature.

10. A method for reducing or eliminating optical defects in injection molded optical components by cleaning machine parts of an injection machine prior to production of the optical components comprising the steps of separating the machine parts into pressurized and non-pressurized machine parts, being those parts subjected to pressure during production of the optical components and those parts not subjected to pressure during production of the optical components, respectively, thermally cycling pressurized machine parts in isopropyl alcohol, wherein each thermal cycle comprises heating the alcohol from room temperature o about 40° C. followed by cooling back to room temperature, and cleaning the non-pressurized machine parts in successive baths of isopropyl alcohol using brushes wherein the brushes are cleaned between use by immersion in hot isopropyl alcohol.

* * * * *